United States Patent [19]

Nagao et al.

[11] Patent Number: 4,772,161
[45] Date of Patent: Sep. 20, 1988

[54] PROFILE WORKING MACHINE

[75] Inventors: Takaaki Nagao, 796-58, Sakaine, Kashiwa-shi, Chiba-ken; Yotaro Hatamura, 12-11, Kohinata 2-chome, Bunkyo-ku, Tokyo; Kozo Ono, Toride, all of Japan

[73] Assignees: Takaaki Nagao, Kawasaki; Yotaro Hatamura; Hitachi Construction Machinery Co., Ltd., both of Tokyo, all of Japan

[21] Appl. No.: 20,123

[22] Filed: Feb. 27, 1987

[30] Foreign Application Priority Data

Mar. 3, 1986 [JP] Japan .................................. 61-44165

[51] Int. Cl.$^4$ .................................. B23Q 15/12
[52] U.S. Cl. .................................. 409/148; 51/165.71; 51/165.92; 364/474; 409/187; 409/194; 409/207
[58] Field of Search .................... 364/167, 474; 408/8, 408/11, 13; 409/147, 148, 154, 186, 187, 193, 194, 207, 208; 51/165.71, 165.92

[56] References Cited

U.S. PATENT DOCUMENTS

| | | | |
|---|---|---|---|
| 3,548,172 | 12/1970 | Centner et al. | 408/3 X |
| 3,665,493 | 5/1972 | Glowzewski et al. | 409/80 X |
| 3,746,955 | 7/1973 | Kobayashi | 408/8 X |
| 3,809,488 | 5/1974 | Sonderegger | 408/8 X |
| 3,819,916 | 6/1974 | Watanabe | 364/474 X |
| 4,440,530 | 4/1984 | Yamakage | 408/3 |
| 4,524,543 | 6/1985 | Inoue | 51/165.92 X |
| 4,666,352 | 5/1987 | Nagao et al. | 409/153 |

FOREIGN PATENT DOCUMENTS

| | | | |
|---|---|---|---|
| 2704388 | 3/1978 | Fed. Rep. of Germany | 364/474 |
| 709325 | 1/1980 | U.S.S.R. | 364/474 |

Primary Examiner—Gil Weidenfeld
Assistant Examiner—Steven C. Bishop
Attorney, Agent, or Firm—Oblon, Fisher, Spivak, McClelland & Maier

[57] ABSTRACT

A profile working machine includes a support portion, a working portion, and a drive and control system. The machine also includes displacement sensors for detecting the present relative displacements between the support portion and working portion, a load sensor for detecting each working reaction force exerted to the working portion, a memory unit for storing values corresponding to a predetermined suitable working reaction force detected by the load sensor, a deviation computing unit for computing the deviation of each working reaction force from the values stored in the memory unit, and a displacement computing unit for computing, based on the deviation determined by the deviation computing unit and the present relative displacement detected by the displacement sensors, corrective relative displacements of the support portion and working portion required to bring the difference to 0, whereby the spatial orientation of the load sensor is maintained constant relative to the direction of the suitable working reaction force.

3 Claims, 9 Drawing Sheets

PROFILE WORKING MACHINE

BACKGROUND OF THE INVENTION

1. Field of the Invention

This invention relates to a profile working machine such as die-finishing grinding machine, ceramics-working grinding machine, three-dimensional milling machine or the like.

2. Description of the Prior Art

When performing working or machining to form a free-form curved surface on a work such as die machining, the working or machining is in many instances conducted by mounting a ball end mill or the like on an NC milling machine or a machining center. After such working or machining is performed, cutting tool marks are caused to remain on the thus-finished die. Hence, it cannot be used as a die without any additional machining or treatment. It has thus been required to add a further step in which such cutting tool marks are removed with a shafted grinder held by a hand while observing them. Such a manual work was prevented full automation of machining steps in profile machining work, thereby imposing a serious limitation on the profile machining work.

With a view toward solving this problem, the present inventors have already proposed in Japanese patent application No. 201487/1984 a profile working machining which permits automated working of curved surfaces of a work. The outline of this profile working machine will next be described with reference to FIGS. 9 and 10.

FIG. 9 is a side view of a working tool and a work. In the drawing, there are illustrated a table 1 of a working machine, a work 2 fixedly held on the table 1, and a working tool 3 for grinding the work 2. Letter T indicates a point of action (working point) by the working tool 3 on the work 2, while letter $\mathbb{F}$ designates a working reaction force exerted on the working tool 3.

FIG. 10 is a system diagram of the profile working machine. In the drawing, there are shown a working tool/work system 5 which includes the table 1 and working tool 3, and a load sensor 6 for detecting a force (force components and moment components applied respectively along and about respective axes) to the working tool 3. Designated at letter $\mathbb{F}$ is a force component detected by the load sensor 6, while indicated at letter $\mathbb{M}$ is a moment component detected by the load sensor 6. Numeral 7 indicates a computing unit for control, which is composed of a unit 7A for outputting data on the shape of each working tool (hereinafter called "working tool shape data output unit 7A"), a unit 7B for calculating each working point and tangential plane (hereinafter called working point/tangential plane calculation unit 7B), and a unit 7C for computing each working point and working reaction force (hereinafter called "working point/working reaction force computing unit 7C"). The working tool shape data output unit 7A outputs, as a signal, data $S$ on the shape of the working tool 3, for example, a ball having a radius of such and such millimeters or a cylinder having a radius of such and such millimeters and a length of such and such millimeters. The working point/tangential plane calculation unit 7B calculates the position of the working point T and the tangential plane $P_t$ at the working point T on the basis of the data $S$ output from the working tool shape data output unit 7A and the force $\mathbb{F}$ and moment $\mathbb{M}$ detected by the load sensor 6. The working point/working reaction force computing unit 7C judges, based on the working reaction force $\mathbb{F}$ detected by the load sensor 6 and the working point T and tangential plane $P_t$ calculated by the working point/tangential plane calculation unit 7B, whether the working reaction force $\mathbb{F}$ is suitable or not for the working point T and tangential plane $P_t$, and outputs a position signal $X$ and spatial orientation signal $\circledR$ to correct the working reaction force $\mathbb{F}$.

Designated at numeral 8 is a drive and control system for respective axes, which operates upon input of the signals $X$, $\circledR$. In accordance with the signals $X$, $\circledR$, the drive and control system 8 controls the relative positions $X$ and relative spatial orientations $\circledR$ between the table 1 and working tool 3. Numeral 9 indicates displacement sensors for detecting the present positions and spatial orientations of the table 1 and working tool 3, and outputs the so-detected position signals $X$ and spatial orientation signals $\circledR$.

In the above construction, the working point T and tangential plane $P_t$ are always calculated by the working point/tangential plane calculation unit B, and a judgement is made to determine whether the working point T is located at a point where the working tool 3 can perform machining. When the judgement is "YES", a another judgement is made by the working point/working reaction force computing unit 7C to determine whether the present working reaction force $\mathbb{F}$ is suitable for the working point T and tangential plane $P_t$. When the present working reaction force $\mathbb{F}$ is suitable, the working is continued as is. When it is not, computation is performed to determine how the relative positions $X$ and relative spatial orientations of the working tool 3 and table 1 should be corrected to adjust the working reaction force $\mathbb{F}$ to suitable values. As a result, the working point/working reaction force computing unit 7C gives commands $X$, $\circledR$ the drive and control system 8 for the respective axes. Here, the commands $X$, $\circledR$ may generally be input in the form of target relative positions $X$ and target relative spatial orientations $\circledR$ or in the form of degrees of displacements $\Delta X$, $\Delta$ over which the relative positions and relative spatial orientations should be corrected from the present state.

As mentioned above, the above-described profile working machine can perform machining copying the profile, namely, the curved surface of the work 2 while always maintaining the working reaction force exerted on the working tool 3 at the most suitable value. Therefore, the profile working machine allows to conduct profile machining work automatically under ideal working conditions.

In general, the coordinate system of the working tool 3 is usually different from that of the load sensor 6. No particular correlation is contemplated either between both coordinate systems in the above-described conventional profile working machine. Therefore, each load component detected by the load sensor is based on the coordinate system of the load sensor 6. In order to determine the working reaction force exerted on the working tool 3, computation is required to transform the value detected by the load sensor 6 into a value under the coordinate system of the working tool 3. Since this computation is complex, the computing unit requires lots of time for its design and fabrication and correspondingly, a rather long period of time is needed to perform the computation.

The above computation includes a computation step in which the working point T and tangential plane $P_t$ are determined. This computation is more complex than the above-mentioned computation for the transformation of the coordinate system. One example of this computation is described in U.S. patent application Ser. No. 776,801 of Sept. 17, 1984, now U.S. Pat. No. 4,666,352. It will be clearly understood from the passage how complex the computation is. Moreover, the exemplified computation is limited to a simple example in which the working tool 3 is spherical. Where the working tool 3 has various shapes other than sphere, the computation of the working point T and tangential plane $P_t$ will apparently become more complex. Correspondingly, the computing unit of the working point T and tangential plane $P_t$ requires still more manpower and time for its design and fabrication and at the same time, their computation requires substantial time.

As has been described above, the conventional profile working machine contains, in its control loop, a computation step which requires significant computing time. The conventional profile working machine is therefore accompanied by such drawbacks that its computing unit requires a high fabrication cost and since its responsibility, which is needed for the control of forces, is reduced, it cannot achieve any high working speed.

SUMMARY OF THE INVENTION

An object of this invention is to provide a profile working machine which is free of the above-described drawbacks of the prior art and can improve the working speed and responsibility.

In order to achieve the above-described object of this invention, the present invention provides a profile working machine equipped with a support portion for holding a work thereon, a working portion for machining the work and a drive and control system for controlling any relative displacements between the support portion including relative spatial orientations therebetween, and working portion and adapted to machine the work into a desired profile, comprising:

displacement sensors for detecting present relative displacements between the support portion and working portion;

a load sensor for detecting a working reaction force exerted on the working portion;

a memory unit for storing values corresponding to a predetermined suitable working reaction force detected by the load sensor;

a deviation computing unit for computing the deviation of the working reaction force, which has been detected by the load sensor in the course of a working operation, from the values stored in the memory unit; and a displacement computing unit for computing, based on the deviation determined by the deviation computing unit and the present relative displacements detected by the displacement sensors, corrective relative displacements of the support portion and working portion required to bring any difference to 0, whereby the spatial orientation of the load sensor is maintained constant relative to the direction of the suitable working reaction force irrespective of the position of a working point where the work portion machines the work.

A working reaction force in suitable working conditions has a specific magnitude and direction relative to the tangential plane $P_t$ at the working point T on a curved surface to be machined. Such working reaction force will hereinafter be called "the suitable working reaction force" for the sake of brevity. The working reaction force varies depending on working conditions. In the memory unit, this suitable working reaction force is stored as constant load vector values in a coordinate system fixed on the load sensor. In an actual working operation, working reaction forces are detected by the load sensor during the working operation. Each set of detected values is compared with the values stored in the memory unit. Based on the differences of the detected values and the stored values and the present relative positions and spatial orientations between the work support portion and working portion, computation is performed by the displacement computing unit to determine the relative displacements between the work support portion and working portion required to reduce the differences to 0 (the extents to which the relative displacements and relative spatial orientations must be changed to reduce the differences to 0). When the drive and control system is controlled in accordance with the relative displacements, the direction of the above-mentioned working reaction force is maintained in a state constant relative to the spatial orientation of the load sensor. As a result, the reasonability of the control algorithm of the present system is assured and at the same time, smooth and automatic grinding of a curved surface is materialized.

In the present invention, the suitable working reaction force is set, those values detected by the load sensor are stored, the values of the working reaction force detected by the load sensor in the course of a working operation is compared with the detected and stored values, and the relative positions and relative spatial orientations of the table and working tool support mechanism are then controlled on the basis of the deviation of the detected values from the stored values so as to make the detected values equal to the stored values as described above. It is therefore possible to omit computing steps substantially, to reduce the cost for the fabrication of the unit required for computation and to increase the working speed and responsibility, so that the working capacity can be improved.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENT

Figure 1:
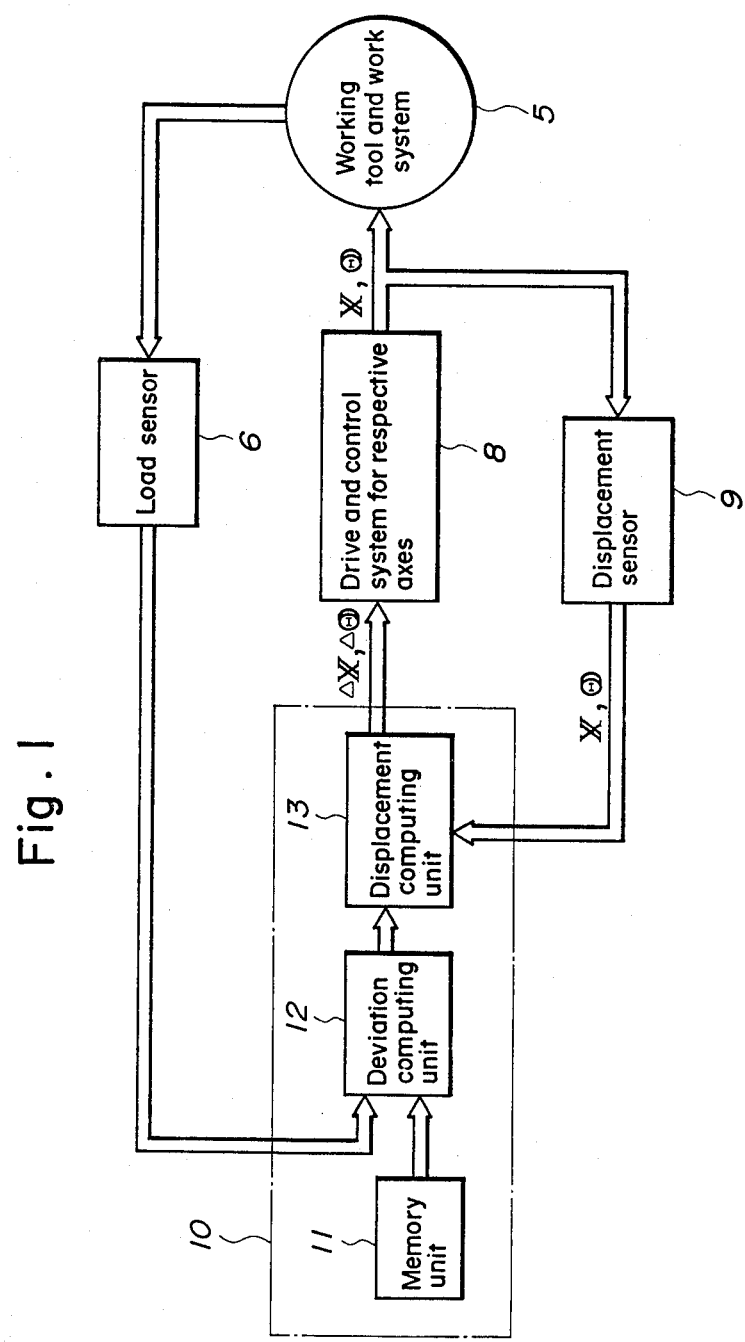
FIG. 1 is a system diagram of a profile working machine according to one embodiment of this invention.

Prior to description of a preferred embodiment of this invention, a description will be made of certain facts revealed as a result of investigations of the present inventors. According to Norio Takenaka, Takaaki Nagao, et al. "A Study on the Face Grinding by Using A Single Grain (First Report)" described in "SEI-MITSU KIKAI (Journal of the Japan Society of Precision Engineering)", 45(9), 1113; and "Erforschung des Mechanismus beim Stirnschleifen" described in "Werkstatt und Betrieb", 112(9), 655 (1979), it is indicated that once grinding conditions such as material to be ground, working tool, feeding speed and depth of grinding are set, the magnitude of the working reaction force and its direction relative to the working surface take substantially constant values. Strictly speaking the expression "the direction is constant relative to the working surface" in a manner suited for profile working, the expression may also read that "the direction is constant relative to the tangential plane for the curved surface, which is to be worked, at the working point as a point of contact between the working tool and work". Since the present invention is directed to profile working, the former expression will be used instead of the latter expression for the sake of simplicity. The above description of the empirical fact is now supplemented. If grinding conditions such as material to be ground, working tool, feeding speed and depth of grinding are constant, it has been known that the direction of the working reaction force is automatically set at its optimum value so long as the magnitude of the working reaction force is solely controlled to have a suitable value. Namely, suitable working conditions can be maintained so long as the magnitude of the working reaction force is controlled solely.

It was necessary to determine the direction of a working reaction force and a working point and tangential plane in the prior art although the magnitude of the reaction force can be known by a load sensor, because such pieces of information were indispensable to judge how the drive and control system for the respective axes should be controlled to correct the magnitude of the working reaction force to its suitable value. If the position of the working point, in other words, the working point of the working reaction force is known relative to the load sensor, it is only necessary to determine the magnitude of the working reaction force to enable the above mentioned controls. It is only true on the assumption that a working tool is usually circular in its cross-section and the worked surface is in contact with the working tool at the working point. This assumption is reasonable in most cases.

Owing to the provision of the above-described means which act as mentioned above, the present invention has now materialized a machine capable of performing smooth profile grinding while always maintaining ideal working conditions for a momentarily-changing curved surface.

The present invention will hereinafter be described on the basis of the illustrated embodiment.

Figures 9, 10:
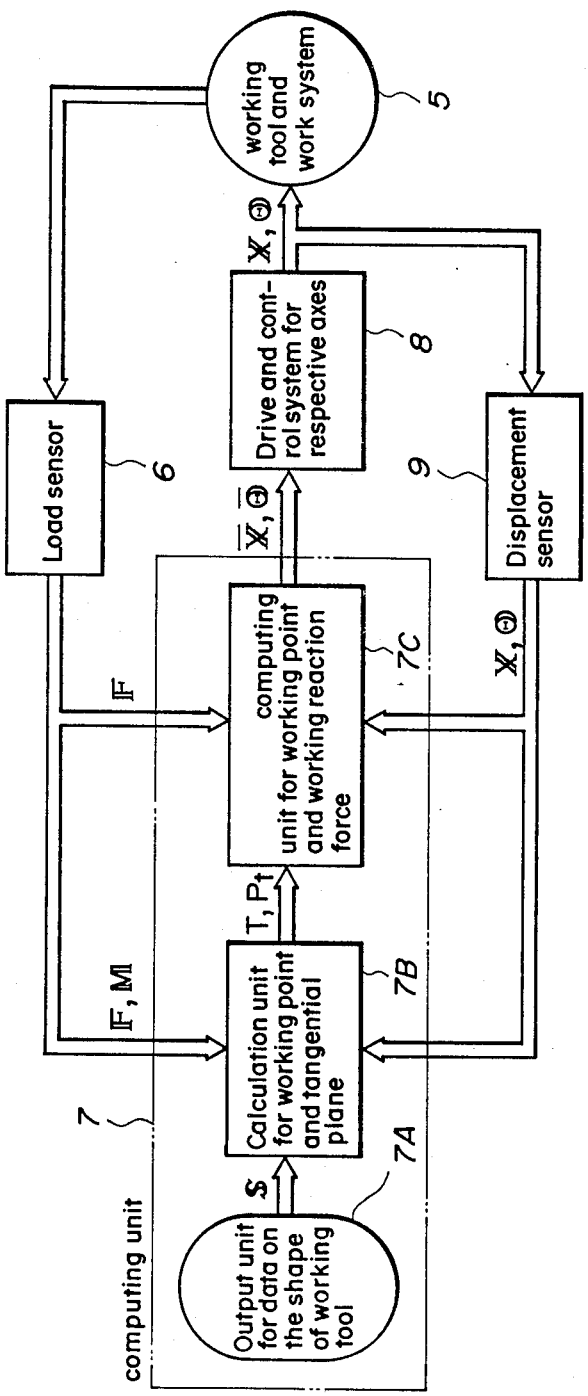
FIG. 9 is a side view of a working tool and work.
FIG. 10 is a system diagram of a conventional profile working machine.

FIG. 1 is a system diagram of a profile working machine according to the preferred embodiment of this invention. In the drawing, parts of structure similar to their corresponding parts shown in FIG. 10 are identified by like reference numerals and their description is omitted. Numeral 10 indicates a computing unit for a constant load vector control. The computing unit 10 is composed of a memory unit 11, deviation computing unit 12 and displacement computing unit 13.

Figure 2:
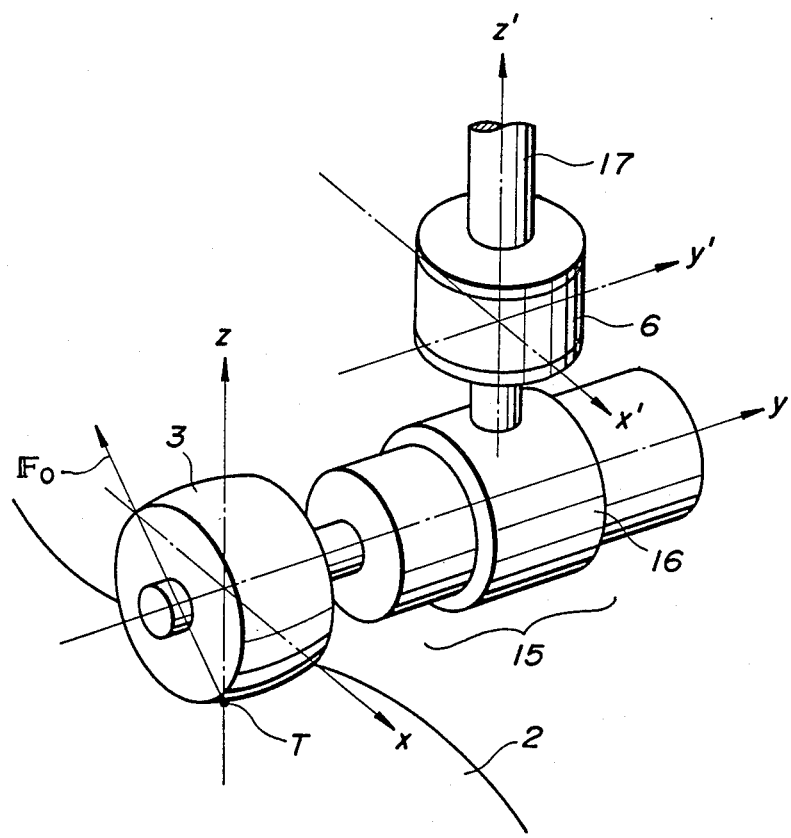
FIG. 2 is a perspective view of a working tool/work system and load sensor depicted in FIG. 1.

FIG. 2 is a perspective view of the working tool/work system and load sensor, both, illustrated in FIG. 1. In the drawing, there are shown a work 2 fixed on a table and a working tool 3. They are the same as those depicted in FIG. 9. Designated at numeral 6 is the load sensor shown in FIG. 1. The load sensor 6 serves to detect force components and moment components along and about the respective axes which extend at right angles. There are also illustrated a working tool support mechanism 15 for holding and driving the working tool 3, a coupling member 16 coupling the load sensor 6 and working tool support mechanism 15 together, and a connecting member 17 connecting the unillustrated main body of the working machine and the load sensor 6 to each other.

The illustrated embodiment is different from the conventional machine in that the conventional machine requires a computing step for the transformation of each coordinate system and another computing step for computing the working point T and tangential plane $P_t$ while these computing steps are not needed for the illustrated embodiment of this invention. These differences will next be described with reference to FIG. 1 and FIG. 2.

In FIG. 2, letters x,y,z indicate the coordinate axes of the working tool 3 whereas letters x',y',z' designate the coordinate axes of the load sensor 6. Once the shape of the working tool 3, the material of the work 2 and various other working conditions are set, the suitable working reaction force exerted to the working point T during the working operation is determined, as mentioned above, as values having a specific magnitude and direction relative to the curved surface which is being worked. The suitable working reaction force will hereinafter be identified by "$\mathbb{F}_o$". This suitable working reaction force $\mathbb{F}_o$ is shown as a vector in FIG. 2. The suitable working reaction force $\mathbb{F}_0$ is exerted on the working point T between the working tool and work while a suitable working operation is being performed. Then, the load sensor 6 detects load components corresponding to the working reaction force $\mathbb{F}_o$ with respect to the respective x', y' and z' axes. Among these load components, force components along the x', y' and z' axes will now be identified respectively by $F_{xo'}$, $F_{yo'}$ and $F_{zo'}$ while moment components about the x', y' and z' axes will hereinafter be identified respectively by $M_{xo'}$, $M_{yo'}$ and $M_{zo'}$.

As a general rule, in order to work a curved surface suitably, it is necessary and sufficient to control the working reaction force exerted on the working point T in such a manner that the working reaction force is always maintained equal to the above-described suitable working reaction force $\mathbb{F}_o$ having a specific magnitude and direction relative to the curved surface under working. For this purpose, the above force components $F_{xo'}$, $F_{yo'}$, $F_{zo'}$ and moment components $M_{xo'}$, $M_{yo'}$, $M_{zo'}$ are first of all stored in the memory unit 11 of the computing unit constant load vector control 10. During the working operation, the force components $F_{x'}$, $F_{y'}$, $F_{z'}$ and moment components $M_{x'}$, $M_{y'}$, $M_{z'}$ of each actual working reaction force F detected respectively along and about the x', y' and z' axes by the load sensor 6 are compared, at the deviation computing unit 12, respectively with the above-mentioned force components $F_{xo'}$, $F_{yo'}$, $F_{zo'}$, and moment components $M_{xo'}$, $M_{yo'}$, $M_{zo'}$ stored in the memory unit 11, whereby the deviations of the former force and moment components from the latter force and moment components are calculated.

The respective deviations calculated at the deviation computing unit 12 are then input to the displacement computing unit 13, where based on the thus-input deviations and the present relative positions and relative spatial orientations of the table 1 and working tool support mechanism 15 detected by the displacement sensors 9, computation is performed to determine how much the table 1 and working tool support mechanism 15 should be moved from their present positions and spatial orientations to reduce the deviations to 0. Values computed at the displacement computing unit 13 are output to the drive and control system 8 for the respective axes. In accordance with these values, the relative positions and spatial orientations of the table 1 and working tool support mechanism 15 are controlled to reduce the above-described deviations to 0.

As a result, the working reaction force is maintained constant in direction relative to the curved surface under working while maintaining its initial value $o$, and at the same time, the direction of the working reaction force and the spatial orientation of the load sensor 6 is always maintained constant in the same relation as the initial relation. In this manner, the profile working operation is performed smoothly.

Here, a brief description is made of the computation by the displacement computing unit 13 in the course of the above operation. As mentioned above, the displacement computing unit 13 serves to compute how the relative positions $X$ and relative spatial orientations $\Theta$ (the combination of these two vectors will hereinafter be identified by a vector $D$ between the table 1 and working tool support mechanism 15 should be corrected from their present positions and spatial orientations in order to reduce the deviation of the working reaction force to 0. The displacement correcting value $\Delta D$ can be represented by the following linear approximation:

$$\Delta D = C \cdot \Delta L \quad (1)$$

where $\Delta L$: vector as a combination of the deviations $\Delta F$ and $\Delta M$ computed by the deviation computing unit 12; and $C$: constant.

In the above linear approximation (1), $\Delta D$ indicates position-correcting values $\Delta x, \Delta y, \Delta z$ along the respective axes and spatial orientation correcting values $\Delta \theta_x, \Delta \theta_y, \Delta \theta_z$ about the respective axes. On the other hand, $\Delta L$ indicates deviations $\Delta F_x, \Delta F_y, \Delta F_z$ of the force components along the respective axes and deviations $\Delta M_x, \Delta M_y, \Delta M_z$ of the moment components about the respective axes. Namely, $\Delta D$ and $\Delta L$ are six-dimensional vectors respectively.

In order to explain the significance of the approximation (1), a determinant expressed in terms of the individual elements of the approximation (1) will next be described as a determinant (2). It should be borne in mind that in FIG. 1, the correcting values $\Delta x, \Delta y, \Delta z$ and the correcting values $\Delta \theta_x, \Delta \theta_y, \Delta \theta_z$ are collectively identified by $\Delta X$ and $\Delta \Theta$ respectively.

$$\begin{bmatrix} \Delta x \\ \Delta y \\ \Delta z \\ \Delta \theta_x \\ \Delta \theta_y \\ \Delta \theta_z \end{bmatrix} = \begin{bmatrix} C_{11} & \cdots & \cdots & \cdots & C_{16} \\ C_{21} & \cdots & \cdots & \cdots & C_{26} \\ C_{22} & \cdots & \cdots & \cdots & C_{36} \\ C_{21} & \cdots & \cdots & \cdots & C_{46} \\ C_{24} & \cdots & \cdots & \cdots & C_{56} \\ C_{61} & \cdots & \cdots & \cdots & C_{66} \end{bmatrix} \times \begin{bmatrix} \Delta F_x \\ \Delta F_y \\ \Delta F_z \\ \Delta M_x \\ \Delta M_y \\ \Delta M_z \end{bmatrix} \quad (2)$$

In the determinant (2), the values $C_{11}$–$C_{66}$ change depending on conditions such as the rigidity of the working machine itself, the rigidity of the work 2 to be worked, the present position and spatial orientation of the working machine, etc. They can be determined when these conditions are specifically indicated.

At the displacement computing unit 13, computation is performed in accordance with the determinant (2). Once the deviation $\Delta L$ is obtained, the correcting value $\Delta D$ for the relative positions and spatial orientations can be determined. As a result, it is possible to maintain the relative positions and relative spatial orientations between the table 1 and working tool support mechanism 15 always in the prescribed state.

As mentioned above, control is performed in this embodiment in such a manner that the detected values $F_{x'}, F_{y'}, F_{z'}, M_{x'}, M_{y'}, M_{z'}$ remain always equal to their corresponding constant values $F_{xo'}, F_{yo'}, F_{zo'}, M_{xo'}, M_{yo'}, M_{zo'}$. This means that the position and spatial orientation of the load sensor 6 are maintained constant relative to the direction and working point T of the prescribed suitable working reaction force $F_o$. It also means that the working point T is always maintained at a point satisfying a certain constant positional relation relative to the working tool support mechanism 15, because the relative positional relation between the working tool support mechanism 15 holding the working tool 3 in place thereon and the load sensor 6 is constant. It is therefore possible to avoid the need for the computation of the working point T and hence to omit the computing step for the working point T, so long as control is effected in the above-described manner. It is also unnecessary to compare the actual working reaction force to the prescribed suitable one in the coordinate system of the working tool 3. This eliminates the computation for the transformation of the actual working reaction force detected as values in the coordinate system of the load sensor 6 to those in the coordinate system of the working tool 3, thereby permitting the omission of the computing step for the transformation.

Advantages which have been brought about from the omission of these computing steps can be clearly understood, if a description is made of actual computation performed in the conventional working machine. It is however too complex to explain this computation on a general example. It will therefore be described in the second specific example which is a special example of the present embodiment and will be described later in this specification.

The embodiment of this invention has been described above. The description of the above embodiment has been made on a general example in which the positions and spatial orientations of the load sensor 6 and the suitable working reaction force $F_o$ are in an arbitrary relation. If the positional relation between the load sensor 6 and the suitable working reaction force $F_o$ is chosen to meet a certain specific relation, other meritorious features can be brought about in addition to the advantage that the computing steps can be omitted. Another description will next be made of two specific examples in which the positional relation between the load sensor 6 and the suitable working reaction force $F_o$ is chosen to meet a certain specific relation.

Figure 3:
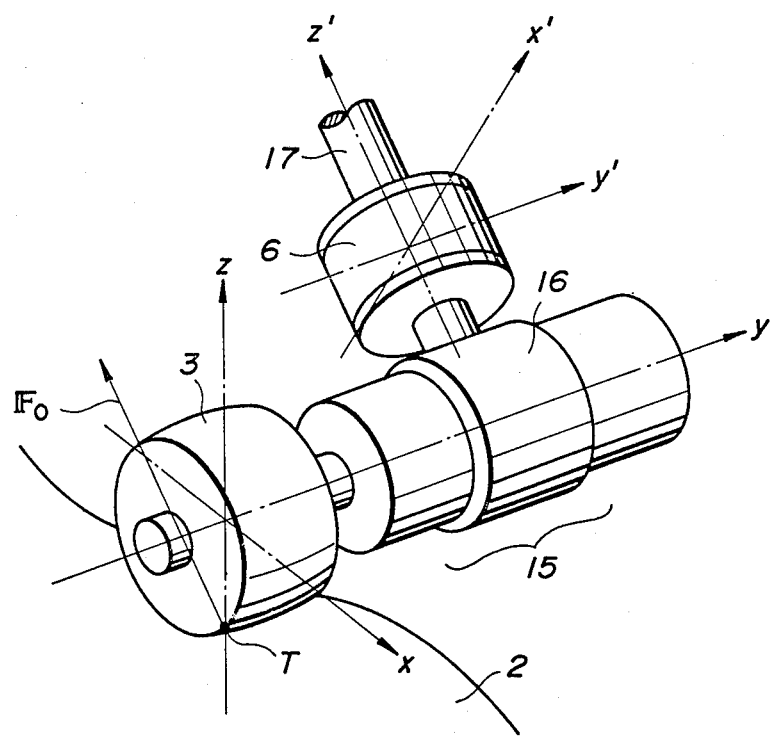
FIG. 3 is a perspective view of a working tool/work system and load sensor according to the first specific example of the embodiment.

FIG. 3 is a perspective view of a working tool, work and load sensor according to the first specific example of this embodiment. In the drawing, parts of structure similar to their corresponding parts shown in FIG. 2 are identified by like reference numerals and letters and their description is omitted. As apparent from the drawing, the relation between the load sensor 6 and the suitable working reaction force $_o$ in this specific example is chosen in such a way that one of the coordinate axes of the load sensor 6 (the z' axis in the illustrated example) extends in parallel with the direction of the working reaction force $F_o$.

When the positional relation between the load sensor 6 and the working reaction force $F_o$ is set in the above-described manner, the force components ($F_{xo'}, F_{yo'}, F_{zo'}$) and moment components ($M_{xo'}, M_{yo'}, M_{zo'}$) detected by the load sensor 6 upon exertion of the working reaction force $F_o$ on the working point T are obviously values conforming the coordinate axes x', y', z' shown in FIG. 3. These values are stored in the memory unit 11 of the computing unit for constant load vector control 10. During the working operation, the force components ($F_{xo'}, F_{yo'}, F_{zo'}$) and moment components ($M_{xo'}, M_{yo'}, M_{zo'}$) detected by the load sensor 6 are compared, at the deviation computing unit 12, axis by axis with their corresponding values stored in the memory unit 11 to compute their differences. The so-computed deviations are input to the displacement computing unit 13 to calculate the relative positions and relative spatial orientations of the table 1 and working tool support mechanism 15 for their correction. The respective axes are then driven by way of the drive and control system 8 for the respective axes. As a result, the table 1 and working tool support mechanism 15 are controlled in such a manner that the z' axis of the load sensor 6 is always maintained coincident with the suitable working reaction force $F_o$.

Since the z' axis of the load sensor 6 and the direction of the suitable working reaction force $F_o$ are parallel to each other in this specific example, the force components $F_{xo'}, F_{yo'}$ and moment components $M_{yo'}, M_{zo'}$ detected by the load sensor 6 upon exertion of the working reaction force $F_o$ are 0 and their corresponding values stored in the memory unit 11 are also 0. Accordingly, the force components $F_{x'}, F_{y'}$ and moment components $M_{y'}, M_{z'}$ detected by the load sensor 6 in the course of the working operation are deviations by themselves. It is thus unnecessary to perform computation with respect to these components at the deviation computing unit 12, thereby simplifying the computation.

So long as the above control mode is running without any problems, values detected on these components become extremely small compared with values detected with respect to the other components. It is hence possible to lower the rated capacities of the load sensor 6 for these components, and as a result, to increase the sensitivity to these components. For these reasons, the accuracy of the overall control is increased significantly. In general, the rated capacities of the moment components are limited above larger levels because they are products of the suitable working reaction force $F_o$ and the distances from the working point T to a point determined corresponding to the center of the coordinate system of the load sensor 6. Due to such larger rated capacities, it may not be possible to achieve sufficiently high sensitivity in some instances. Unlike the above-mentioned situation, the present embodiment makes it possible to increase the sensitivity with respect to moments about the y' and z' axes so that a significant contribution has been brought about to the control accuracy.

Since a coordinate system has been set to make one of the axes of the load sensor and the direction the suitable working reation force parallel to each other in the present specific example, it is possible not only to omit the computing steps but also to improve the sensitivity of the load sensor with respect to components along and round a desired axis. As a consequence, the overall control accuracy can be improved.

Figure 4:
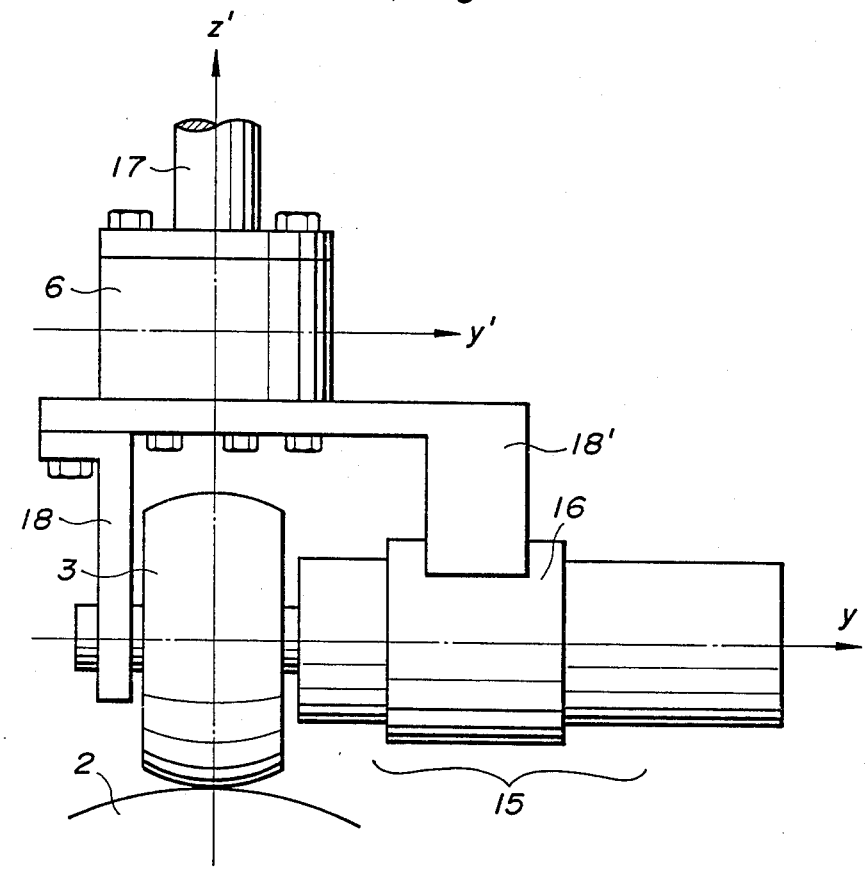
FIGS. 4 and 5 are front and side views of a working tool/work system and load sensor according to the second specific example of the embodiment.
Figure 5:
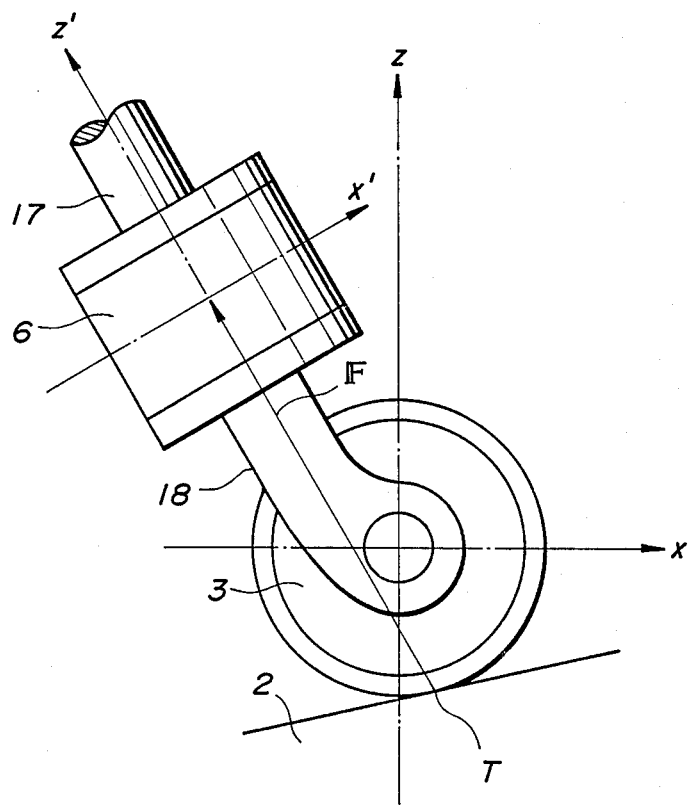

FIGS. 4 and 5 are respectively fron and side views of a working and load sensor according to the second specific example of the present embodiment. In the drawings, parts of structure similar to their corresponding parts shown in FIG. 2 are identified by like reference numerals and letters. Numerals 18,18' indicate load sensor support members which are connected respectively to the shaft of the working tool 3 and the coupling member 16 and support the load sensor 6. As apparent from the drawings, in the present specific example, the load sensor 6 and suitable working reaction force $F_o$ are chosen in such a relation that one (the z' axis) of the corrdinate axes of the load sensor 6 coincides with the direction of the suitalbe working reaction force $F_o$.

In order to clarify the significant advantages of the present embodiment over the conventional machine, a description will next be made, with reference to FIGS. 6 and 7, of computation by the conventional machine in a simple example of the working reaction force being in the x'-z' plane, namely having only 3 degrees of freedom of force components along x', y' axes and a moment component about y' axis. In these drawings, parts of structure similar to their corresponding parts shown in FIG. 2 are identified by like reference numerals and letters.

Figure 6:
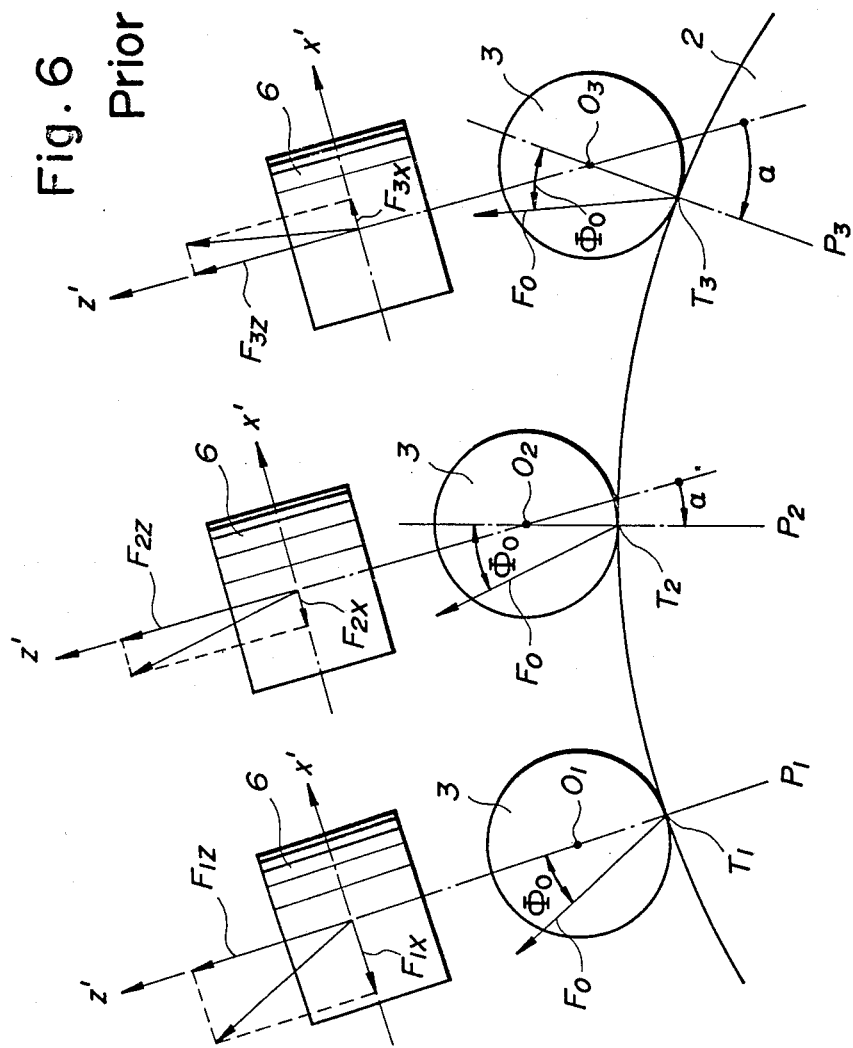
FIGS. 6 and 7 illustrate the progress of a working operation by a conventional machine and the manner of working of the operation.

FIG. 6 shows how a working operation making use of the conventional machine proceeds. The drawing illustrates the manner of progress of the working operation to positions $P_1, P_2, P_3$ in order. There are shown working points $T_1, T_2, T_3$ at the positions $P_1, P_2, P_3$ and central points $O_1, O_2, O_3$ of the working tool 3 at the positions $P_1, P_2, P_3$. As one of typical working methods making use of the conventional machine, it may be mentioned a method in which so long as the working tool 3 can machine the work 2, the working operation is continued while maintaining the spatial orientations of the load sensor 6 and working tool support mechanism 15 as they are. Namely, as illustrated in the drawing, control is performed to maintain the suitable working reaction force $F_o$ and its direction $\Phi_o$ (the angle between the normal at the working point T and the direction of the working reaction force $F_o$) constant relative to the curved surface 2 under the working operation while not changing the spatial orientation of the load sensor 6. However, as the working operation advances from the position $P_1$ to the positions $P_2, P_3$, the angle $\alpha$ between the z'-axis of the load sensor 6 and the normal at the working point T (the angle $\alpha$ is considered to be a parameter representing a relative direction of the tangential plane to the load sensor 6 because the tangential plane is perpendicular to $\overline{O_iT_i}$ at the working point $T_i$)

changes. As a result, the force components $F_{x'}, F_{z'}$ and moment component $M_{y'}$ detected by the load sensor 6 also vary as shown in the drawing (the illustration of $M_{y'}$ is omitted). Let's thus determine the relation between the values $F_{x'}, F_{z'}, M_{y'}$ detected by the load sensor 6 and the actual working reaction force F, its direction $\Phi$ and the angle $\alpha$.

Figure 7:
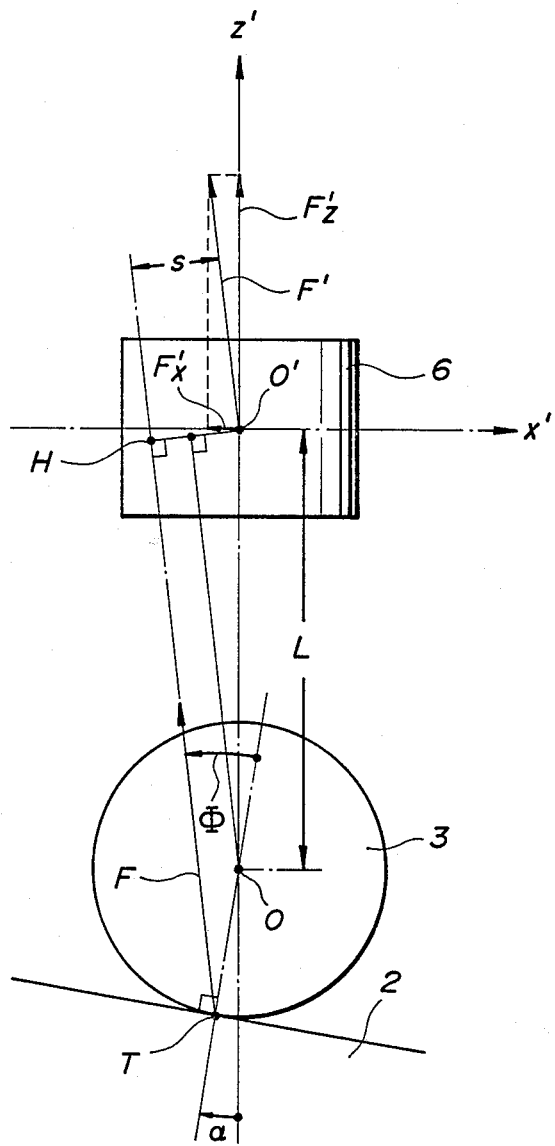

FIG. 7 shows the manner of working at a certain working position in the course of a working operation which is being performed in the same manner as that depicted in FIG. 6. Let's now assume:

L: the distance between the center O of the working tool 3 and the origin O' of the coordinate system of the load sensor 6;

r: the radius of the working tool 3; and s: the distance between the origin O' of the coordinate system of the load sensor 6 and a crossing point H of an extension of the working reaction force F and a perpendicular drawn from the origin O' to the extension.

Here, the angle between the perpendicular drawn from the origin O to a line segment O'-H and the z'-axis becomes $(\Phi - \alpha)$.

Since the working reaction force and the detected composite force F' are parallel to each other, $$F_{x'} = -F \cdot \sin(\Phi - \alpha) \tag{3}$$

$$F_{z'} = F \cdot \cos(\Phi - \alpha) \tag{4}$$

On the other hand, the moment component $M_{y'}$ which is to be detected is represented as follow:

$$M_{y'} = F \cdot s \tag{5}$$

Here, the distance s is:

$$s = L \cdot \sin(\Phi - \alpha) + r \cdot \sin \Phi \tag{6}$$

Accordingly, $$M_{y'} = FL \cdot \sin(\Phi - \alpha) + Fr \cdot \sin \Phi \tag{7}$$

From the equations (3) and (4), the working reaction force F and its direction $\Phi$ are expressed as follows:

$$F = \sqrt{(F_{x'})^2 + (F_{z'})^2} \tag{8}$$

$$= \sin^{-1}(-F_{x'}/F) + \alpha \tag{9}$$

However, the direction $\Phi$ of the working reaction force F is still unknown unless the angle $\alpha$ is known in the equation (9). In other words, the direction $\Phi$ of the working reaction force is not known so long as the working point T and the tangential plane at the working point T are unknown. It is thus necessary to determine the angle $\alpha$ by using the moment information $M_{y'}$ in the equation (7). Namely, from the equation (3), $$\sin(\Phi - \alpha) = -F_{x'}/F \tag{10}$$

Inserting the equation (10) into the equation (7), $$M_{y'} = -LF_{x'} + Fr \cdot \sin \phi \tag{11}$$

$$\phi = \sin^{-1} \frac{M_{y'} + LF_{x'}}{rF} \tag{12}$$

In the above-described manner, the working reaction force F and its direction $\Phi$ can be determined for the first time by ascertaining the position of the working point T and the tangential plane (angle $\alpha$) at the working point T while making use of the detected load information $F_{x'}, F_{z'}, M_{y'}$ in their entirety.

It is then necessary to compare the so-determined working reaction force F and its direction $\Phi$ with the suitable working reaction force $F_o$ and its direction $\Phi_o$ so that their deviations are determined. Namely, the deviation $\Delta F$ of the working reaction force and the deviation $\Delta \Phi$ of its direction are:

$$\Delta F = \sqrt{(F_{x'})^2 + (F_{z'})^2} - F_o \tag{13}$$

$$\Delta \phi = \sin^{-1}\left(\frac{M_{y'} + LF_{x'}}{rF}\right) - \phi_o \tag{14}$$

From the equations (3), (4) and (11), the following equations can be derived to determine how much the values $F_{x'}, F_{z'}, M_{y'}$ change respectively when F and $\Phi$ vary by $\Delta F$ and $\Delta \Phi$ respectively.

$$\Delta F_{x'} = -\Delta F \cdot \sin(\Phi - \alpha) - F \cdot \cos(\Phi - \alpha) \cdot \Delta \Phi \tag{15}$$

$$\Delta F_{z'} = \Delta F \cdot \cos(\Phi - \alpha) - F \cdot \sin(\Phi - \alpha) \cdot \Delta \Phi \tag{16}$$

$$\Delta M_{y'} = -\Delta F_{x'} \cdot L + r(\Delta F \cdot \sin \Phi + F \cdot \cos \Phi \cdot \Delta \Phi) \tag{17}$$

By inserting the values, which have been determined in the equations (13) and (14), in the values $\Delta F$ and $\Delta \Phi$ in these equations (15), (16) and (17), it is for the first time possible to obtain the intended deviations, namely, the deviations required for controlling the working reaction force and its direction in such a way that they coincide respectively with the values $F_o$ and $\Phi_o$.

The conventional machine needs such cumbersome computation as mentioned above to obtain the required deviations even in the simplest case having a degree of freedom with respect to three axes only. The complexity of computation apparently increases in a geometric series as the degree of freedom increases one axis by one axis. Such computation may itself be performed so long as it is done by those skilled in the art. If it is performed at the control and computing unit 7 of the conventional machine shown in FIG. 10, a long computing time is required, the performance of the control is reduced, and the fabrication cost of the computing means increases.

Figure 8:
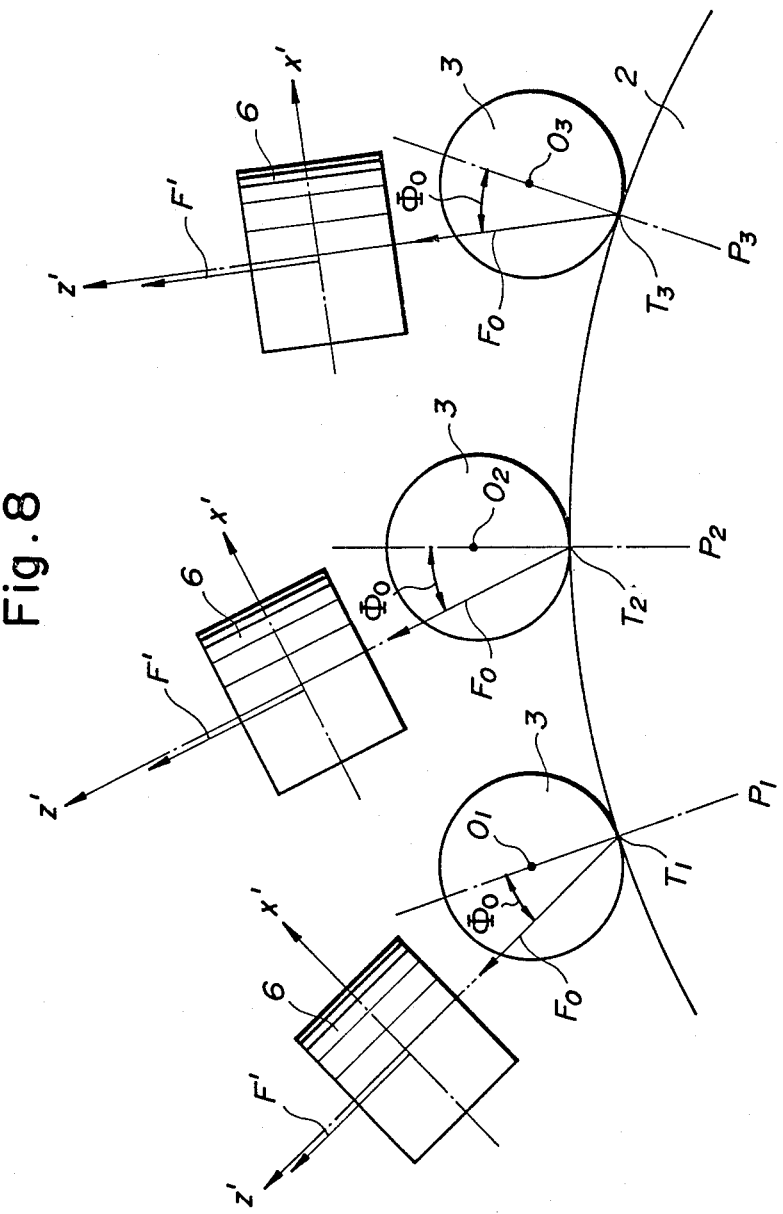
FIG. 8 illustrates the progress of a working operation in the second example of the embodiment.

In the second specific example having the same degree of freedom of 3, deviation signals can however be obtained with extreme ease in the following manner without need for such complex computation as that required in the conventional machine. Namely, FIG. 8 shows the manner of progress of a working operation in the second specific example. Parts of structure and positions similar to their corresponding parts and positions as depicted in FIG. 6 are identified by like reference numerals and letters. As will be understood immediately from the drawing, it is only necessary in this specific example to control the direction $\Phi_o$ of the suitable working reaction force $F_o$ and the z'-axis in such a way that they are always coincided with each other. It is hence necessary to perform the control in such a way that the force component $F_{z'}$ detected by the load sensor 6 becomes the working reaction force $F_o$ and both force component $F_{x'}$ moment component $M_{y'}$ become 0. The values $F_{x'}, M_{y'}$ detected by the load sensor 6 are therefore obtained directly as deviations $\Delta F_{x'}, \Delta M_{y'}$. Consequently, the computation by the computing unit for constant load vector control 10, which is shown in FIG. 1, becomes only the subtraction of $(F_{z'} - F_o)$ in the second specific example. It is thus clear that the time required for the computation is significantly shortened compared with the conventional machine.

As mentioned above, the complexity of the computation increases in a geometric series in the conventional machine as the degree of freedom increases. In the present embodiment, it is only necessary to perform six subtractions even if the degree of freedom is 6. Compared with the conventional machine, the computation is simplified further as the degree of freedom increases.

Computation by the conventional machine has been described above to show that the present specific example can leapingly shorten the computing time in comparison with the conventional machine. The specific example has other advantages. In the present specific example, as mentioned in the description of the first specific example, detected values of the components other than the force component along the z'-axis become extremely small. It is thus possible to increase the sensitivity to such components and to increase the control accuracy significantly with respect to the components. In a load sensor, there is generally a specific relation between the rated capacity of its force and the rated capacity of its moment. It is thus impossible to set only one of the rated capacities at a large level irrespective of the other one. According to the conventional method, the working points of forces are remote from the load sensor. Large moments are therefore applied to the load sensor. If the rated moment value is increased in view of the large moments, the rated force value has to be increased correspondingly. Small forces must thus be measured in the large measurement range, leading to a drawback that the control accuracy is reduced considerably. Since all moment components are detected with small values in the present specific example, it is feasible to determine the rated force value in accordance with the magnitudes of forces which occur actually. This improves the control accuracy and at the same time, permits use of a load sensor having a rated capacity smaller compared with the conventional method. The machine can therefore be fabricated at a lower cost. If a load sensor having the same rated capacity as the conventional machine is used, the machine of this invention allows to control greater loads with the same load sensor although the conventional machine does not permit application of large forces due to increased moments and the working capacity is considerably limited. Unlike the conventional machine, the machine of this invention permits the control of greater loads by using the same load sensor.

Since one of the axes of the load sensor and the direction of the suitable working reaction force are set to coincide with each other in this specific example as mentioned above, the present specific example brings about the same effects as the second specific example and at the same time, increases the working capacity compared with the conventional machine equipped with the same load sensor. By using a load sensor having a smaller rated capacity, it is feasible to improve the working accuracy and to construct the machine at a lower cost.

One general example of the embodiment and its specific examples have been described above. As a matter of fact, the present embodiment can omit computing steps which have been considered to be indispensable in the conventional machine. It is therefore possible to reduce the fabrication cost for the part required for computation. The present embodiment has also brought about such additional effects that the computing speed can be shortened considerably and the responsibility can be improved. It is also possible to retain, without any problems, the characteristic feature that a work can be worked automatically while always maintaining the working reaction force at a suitable value. When one of the coordinate axes of the load sensor and the direction of the prescribed suitable working reaction force are brought into a specific correlation, it is possible to increase the working capacity or to increase the detection sensitivity of the load sensor so as to improve the control accuracy. Besides, the present embodiment has another a further advantage that it permits use of a load sensor having a smaller rated capacity.

Having now fully described the invention, it will be apparent to one of ordinary skill in the art that many changes and modifications can be made thereto without departing from the spirit or scope of the invention as set forth herein.

What is claimed is:

1. A profile working machine equipped with a support portion for holding a work thereon, a working portion for machining the work and a drive and control system for controlling any relative displacements between the support portion and working portion and relative spatial orientations therebetween, and adapted to machine the work into a desired profile, comprising:
   displacement sensors for detecting present relative displacements between the support portion and working portion;
   a load sensor for detecting a working reaction force exerted on the working portion;
   a memory unit for storing values corresponding to a predetermined suitable working reaction force having a predetermined direction;
   a deviation computing unit for computing the deviation of the working reaction force, which has been detected by the load sensor in the course of a working operation, from the values stored in the memory unit; and
   a displacement computing unit for computing, based on the deviation determined by the deviation computing unit and the present relative displacements detected by the displacement sensors, corrective relative displacements of the support portion and working portion required to bring any difference to 0,
   whereby the spatial orientation of the load sensor is maintained constant relative to the direction of the suitable working reaction force irrespective of the position of a working point where the work portion machines the work.

2. A profile working machine according to claim 1, wherein the load sensor defines plural coordinate axes and the values stored in the memory unit are such values that one of the coordinate axes of the load sensor is made parallel with the direction of the suitable working reaction force.

3. A profile working machine according to claim 1, wherein the load sensor defines plural coordinate axes and the values stored in the memory unit are such values that one of the coordinate axes of the load sensor is coincided with the direction of the suitable working reaction force.

* * * * *